Feb. 4, 1930. N. VON GRIBOJEDOFF 1,745,821
INTERNAL COMBUSTION ENGINE
Filed May 26, 1927   5 Sheets-Sheet 1
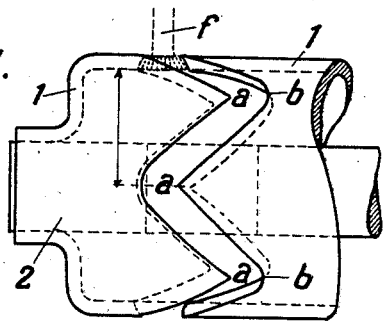
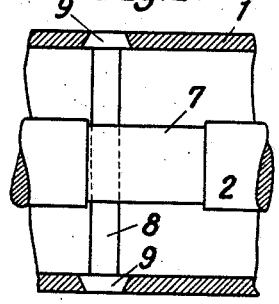 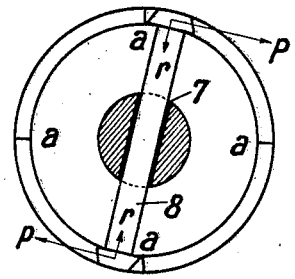
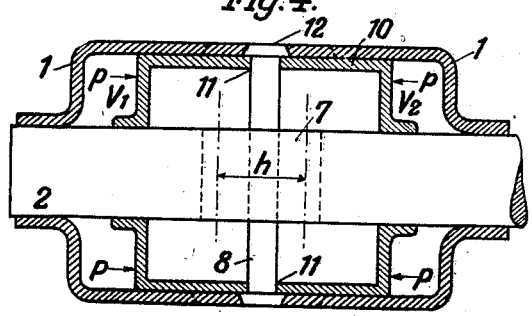
Inventor:
N. von Gribojedoff
by Chas. J. Williamson
Atty Feb. 4, 1930. N. VON GRIBOJEDOFF 1,745,821
INTERNAL COMBUSTION ENGINE
Filed May 26, 1927    5 Sheets-Sheet 3

Inventor:
N. von Gribojedoff,
by Chas. J. Williamson
Atty

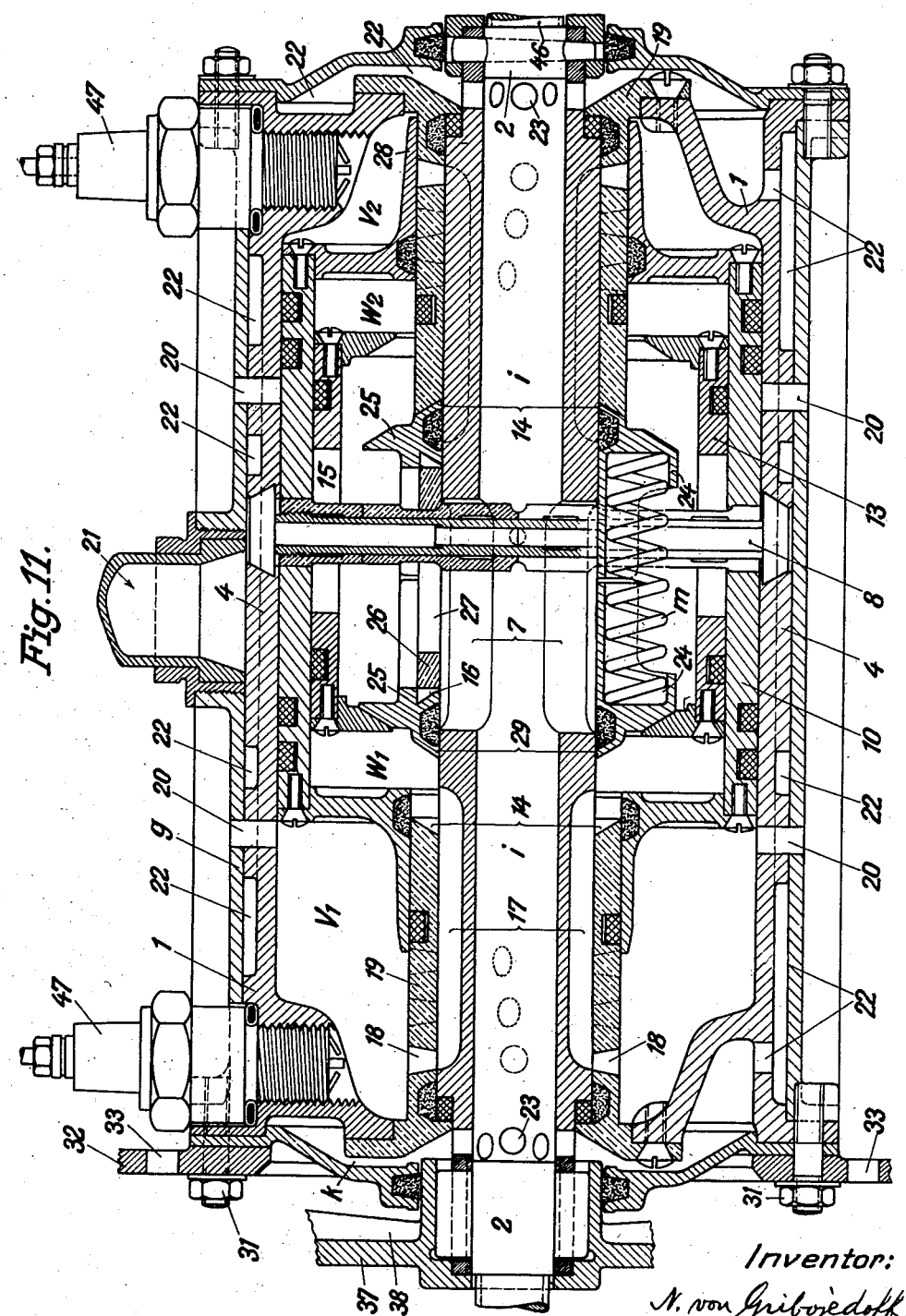

Feb. 4, 1930.   N. VON GRIBOJEDOFF   1,745,821
INTERNAL COMBUSTION ENGINE
Filed May 26, 1927   5 Sheets-Sheet 5

Patented Feb. 4, 1930

1,745,821

UNITED STATES PATENT OFFICE

NICOLAI von GRIBOJEDOFF, OF DUSSELDORF, GERMANY

INTERNAL-COMBUSTION ENGINE

Application filed May 26, 1927, Serial No. 194,413, and in Germany March 18, 1927.

Various kinds of engines have been known hitherto which should make it possible to obtain a maximum number of useful explosion periods. The solutions of this problem which have been made up to the present are, however, not yet perfect in respect of power, wear of material or the like.

The present invention concerns a novel solution with improvements in relation to the use of power, the number of explosion periods and other considerable advantages which accompany it in the direction of a new principle and a new arrangement in internal combustion engines.

The improved arrangement consists in internal pistons and seatings, which constitute several chambers and the like, which pistons are partly moved backwards and forwards, so that a double acting results. The piston and the seatings which thus move partly to and fro and form the reciprocatory working periods can, moreover, apart from the reciprocatory movement, be moved in a rotary manner. Thus, on the rotation of their circumference or of a shaft, the pistons are caused to be moved frequently through a curved guide backwards and forwards in their axial direction for the purpose of more frequent working efficiency. Thereby the working efficiency of the engine is considerably greater at a lower speed and the constructional simplicity and reliability are correspondingly increased. Moreover, the purposes of application are manifold, in that the engine can be used direct or indirect with or without coupling and disposed either in groups one behind the other or side by side. Furthermore, the new arrangement brings with it advantages in ignition, oiling and cooling.

In the drawing, an embodiment of the invention is represented in Figures 1 to 13, in which Fig. 1 shows the reciprocatory movement in principle.

Fig. 2 is a partial transverse section of Fig. 1.

Fig. 3 is a transverse section of Figs. 1 and 2 with a rotating carrier.

Fig. 4 is a sectional view of Fig. 1 with an internal piston.

Figure 5:
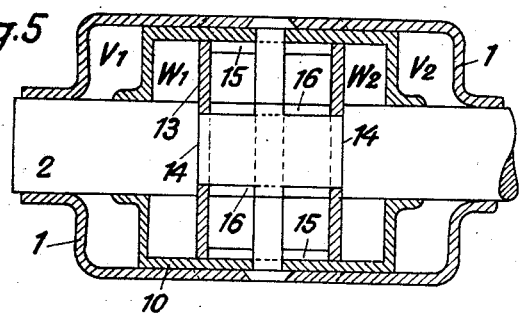
Fig. 5 shows Fig. 4 with a further internal double-ended piston.
Figure 6:
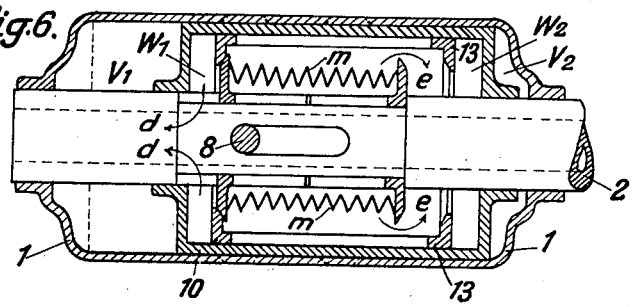
Fig. 6 shows how the ignition periods are advanced by the elaboration of the internal central piston.
Figure 7:
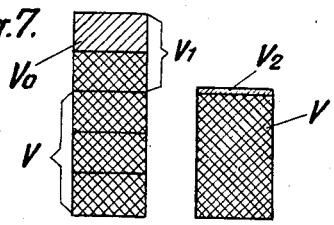

Fig. 7 consists of comparative diagrams, showing relative efficiencies.

Figure 8:
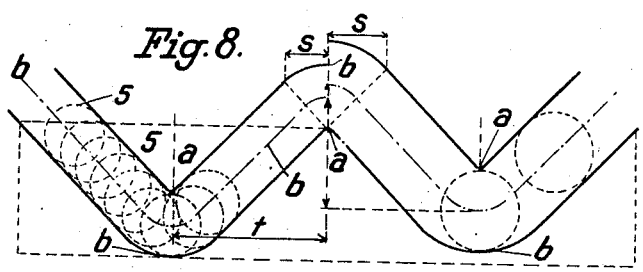

Fig. 8 shows the development of a curved slot for the axial reciprocatory movements of the piston.

Figure 9:
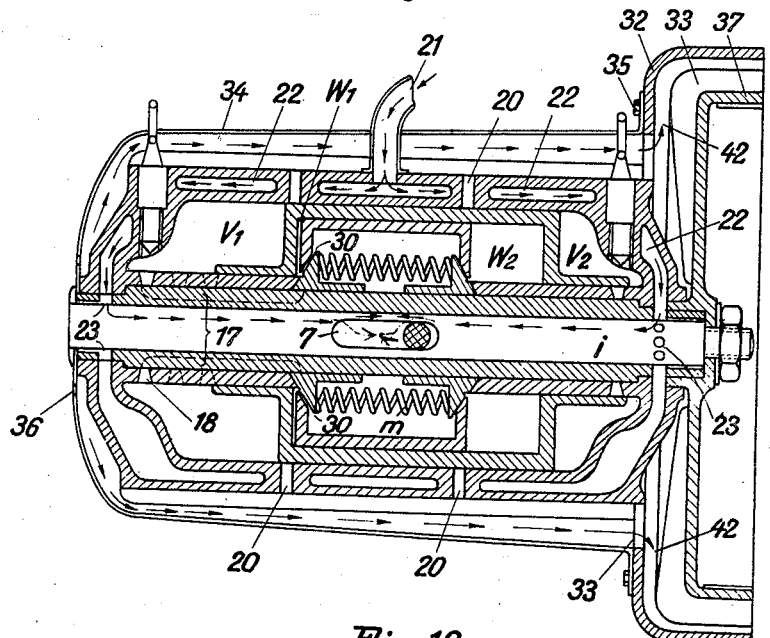

Fig. 9 is a complete transverse section of the arrangement with an outer casing and flywheel.

Figure 10:
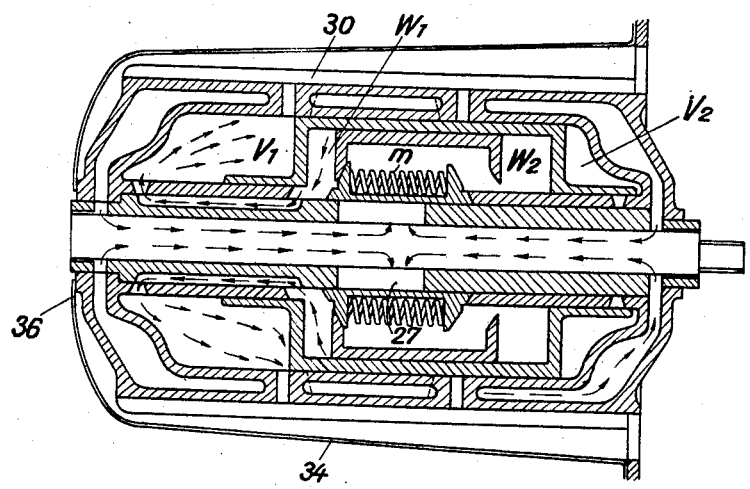

Fig. 10 is a partial section of Fig. 9 with pistons in a different position.

Fig. 11 is a complete transverse section through the new engine.

Figure 12:
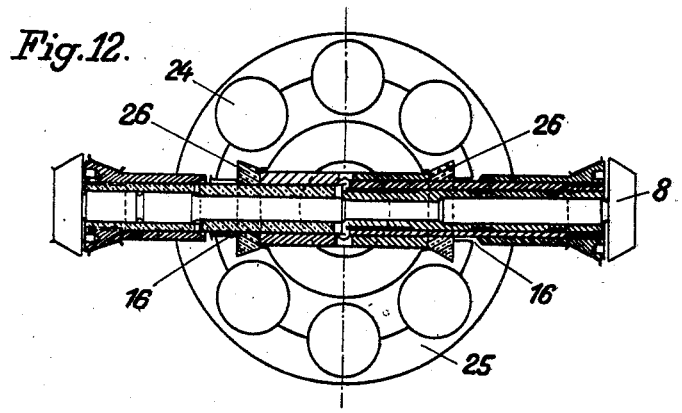

Fig. 12 is a partial transverse section of internal and external rotating carriers with tubular pressure surface devices on a spindle and also a partial plan of spring supporting surfaces.

Figure 13:
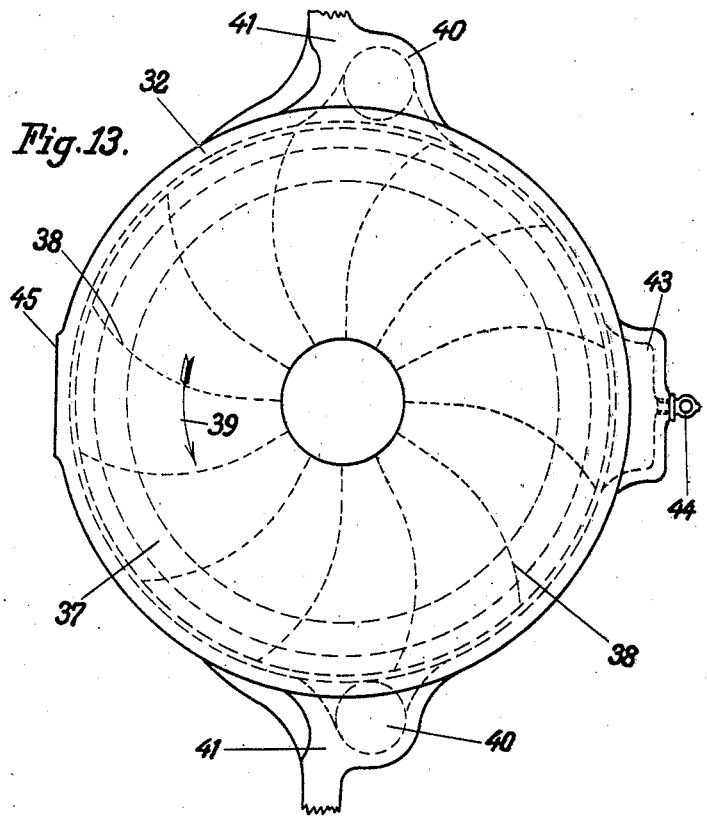

Fig. 13 is an end elevation of Fig. 9 from which it is clear that the flywheel may be provided with curved ribs for the purpose of giving a ventilator effect to the radiator cover which is provided with openings at the front and extensions at the back.

Through Figures 1 to 8, the principle of construction for this new engine is shown, and from Fig. 1 can be seen the manner in which a curved groove $a$ is made in the casing $l$ by millings $f$ for the reciprocatory movement of pistons. The internal shaft 2 has a slotted portion 7 of reduced diameter. This slotted portion 7 is in its longitudinal direction turned out to the dimension $h$ (Fig. 4). In the slotted portion 7 is disposed a rotating carrier 8 of suitable form, which engages with corresponding heads 9 in the curved slot $a$. On the carrier 8 the forces $p, p$ and $r, r$ (Fig. 3) come into operation. In the casing $l$ a piston 10 is disposed freely on the shaft 2. The bolt 8 goes through this casing so that the movement thereof in the direction of the shaft 2 causes the piston 10 to move at the same time. By means of this internal piston 10 and the casing $l$ the chambers $v^1$ and $v^2$ are formed. By means of the further internally disposed piston 13 which rests on the shaft 2 against stops 14, two other chambers $w^1$ and $w^2$ are formed. The piston 13 also has internally on the walls 15 and 16 a longitudinal slot so that the carrier 8 can move backwards and forwards in a longitudinal direction in the said slot. The central piston 13 is of special construction in that plate like valves 25 influenced by springs $m$ (Figs. 6 and 11) control in a valve-like manner the passages $d$ and $e$.

This central piston 13 is represented in Figs. 9 to 12 in different period positions of the working cycle or track.

The shaft 2 having channels 17 (Figures 11 and 9) is of tubular form with corresponding apertures 18 in the sleeve 19 which latter at the same time acts as the bearing for the rotating shaft 2 of the engine. Through the partial backward and forward movement of the working piston, and by means of its rotary movement and the continuous curved slots, the capacity compression chambers $v^1$, $v^2$, $w^1$, $w^2$, change from maximum to minimum.

The expulsion of the exploding gases takes place, as is shown in Figs. 9, 10 and 11, through the larger apertures 20 which are disposed on the periphery of the casing. Thereby a large outlet passage is formed for the escaping gases so that especially in the event of small multiple explosions occurring on both sides at one revolution of the shaft, an approximately ten times greater outlet passage for the gases is provided in comparison with that obtainable in present-day engines.

The diameter of the cylinder remaining the same, the number of piston strokes is dependent upon the size of the division $t$ of the track of the curve $a$. These piston stokes have corresponding lower speeds relative to the curves on their return in the axial direction in comparison with the continuous rotations. The time taken over the movement of the pistons is used for expelling the products of combustion and at the same time filling the chambers $v^1$ and $v^2$ with fresh gas.

The fresh gases (Figs. 9, 10 and 11) leave the carburetter and enter through the tube 21 through annular channels 22, and cover channels $k$ and pass through ports 23 into the hollow chamber $i$ of the shaft 2. From this hollow chamber $i$ the fresh gases pass into the slot or flutes 7 and go through ports in the central carrier 8 into the combustion chambers $w^1$ and $w^2$. The double-ended central piston is influenced by the springs $m$ as the tendency of the springs is always to expand. This expansion is limited by the stops 14. The central piston valves 25 which come under the direct influence of the springs $m$ are connected with the parts 26 and slots 27 by carrier bolts 8. The piston 10 (Fig. 11) which is at the point of rotation corresponding with the line of the curve $a-b$ (Fig. 8), by virtue of its movement and the friction set up between it and piston 13 takes the said piston 13 with it. In the same direction the springs $m$ take effect being supported in the bearing 14 so that through the movement of the internal double-ended central piston valves 25 (Figs. 10 and 11) the area of the combustion chamber $w^1$ is reduced. The reduction of the capacity of this chamber occurs through the movement of the piston from right to left, on overcoming the resistance of the gases from the chamber $w^1$. During this period, these gases leave the chamber $w^1$ through shaft channels 17 and sleeve apertures 18 and pass to the chamber $v^1$ and there expel the previously used gases through apertures 20. On the right side of the inlet of fresh gases into the combustion chamber $w^2$ is completed during this time. In the same time there occurs in chamber $v^2$ an explosion with a corresponding direction of movement of the piston 10 from right to left. Thereby the openings 18 on the right combustion chamber $v^2$ are covered by the projecting part 28 of the piston 10 and the channels 17 are closed. On this movement of the piston from right to left, the outlet apertures 20 are now closed and the fresh gases from the chamber $w^1$ (Figs. 10 and 5) enter the chamber $v^1$ and there receive compression which can be determined by varying strengths of springs, until the ignition of the explosive gases on the left side occurs whereupon the process is repeated on the right side. On the advance of the piston 13 towards the chamber $w^1$, the capacity of the chamber $w^2$ is increased in that the suction of the fresh gases takes place in the combustion chamber through the slots 7 and 27.

Further working period positions are shown in Figs. 9 and 10, as follows—

1. The end of the exhaust through the apertures 20 of the explosive gases from the combustion chamber $v^1$.
2. The end of the filling of this combustion chamber $v^1$ with fresh gases from the combustion chamber $w^1$.
3. The commencement of the working effect of the explosion in the combustion chamber $v^2$.
4. The end of the inlet of the fresh gases to the combustion chamber $w^2$.
5. The escape of the remaining compression of the gases in combustion chamber $w^1$.

The escape of the remaining compression occurs through the annular channel 30 which is slightly opened, and through which the compression is released.

It can be seen that the suction process on the fresh gases and also the process of expulsion of the explosive gases occur under much more favourable conditions than with present-day engines. This is diagrammatically represented in Fig. 7, in which $v^1$ and $v^2$ are the dead spaces shown in comparison. The dead spaces in present-day engines can be estimated at at least $2V^0$ with the same cubical capacity, owing to the remaining pressure, that is to say, this loss amounts to approximately ⅔ths of the entire cubical capacity.

The fresh gases pass (Figs. 9, 10 and 11) on their way from the carburetter through the channels 21, the annular channels 22, channels 23, shaft passage 7 and slots 27 to the combustion chambers $w^1$, $w^2$ and $v^1$ and $v^2$, and travel over the whole periphery of the cylinder. They cool the engine internally and externally in addition to the ventilating effect in the radiator cover 24. As the flywheel takes the form of a ventilator wheel, suction is produced so that the used gases are withdrawn in a similar manner to the effect of condensation. Furthermore, apertures 42 (Fig. 9) can be provided at the front so that the cooling effect is increased. The casing 1 is provided with ribs of the known kind to enhance this cooling effect.

The lubrication of the individual parts is effected by the oil being added direct to the fresh gas in the fuel. This is the best method of oiling, as thereby the oil is forced to reach all parts of the engine. In the present case, however, the system of oiling is still further improved on the principle of a self-contained separator. The oil is introduced gradually in the form of drops into the fuel through the same inlet channels in the space $i$ of the shaft, where, under the influence of rotation, it lubricates all the surfaces through the corresponding apertures and channels. Owing to the rotation of the central piston 13 and of the piston 10 there is a tendency of the oil to throw itself off again in the form of drops, and in this form and more or less warmed it reaches the internal piston 13 and there serves to oil the walls and the further piston, while any floccid oil of thick constituency is prevented by centrifugal force from passing through the valve apertures 30 of the valves 25, so that only good mixture free from floccid oil can gain access into the ignition chambers $v^1$, $v^2$, which results in the advantage of a reliable ignition without fouling the plugs 47 through floccid oil or drops.

The disposition of the cylinder cooling, formation of the necessary channels for the circulation of the fresh gases and for the simplification of fitting, likewise the construction of the cylinder in relation to the front and rear halves and the assembling all constitute constructional facilities and improvements.

In the ventilation, the current of air is received in the direction of the arrow 42 (Fig. 9). This movement serves not only to cool the surface of the cover of the cylinder $g$ and to remove the waste gases but also to deaden the noise and finally to collect the oil drops. These oil drops are thrown under the influence of the draught from the ventilator on the internal conical walls 32, 34 of the casing $l$, and from there pass into a lower separator chamber 43 and can be removed through a cock 44, while the main current of air escapes, free of oil, through large apertures 40, whereby further inlet apertures 36 can be provided. The extremity 46 of the shaft 2 can be used for inserting the distributor of the electric current.

The importance and the advance of this invention consist in that an engine of the arrangement hereinbefore described can run slowly and at the same time smoothly, whereby the power of the reciprocatory pistons is transformed through the carrier 8 and curved slots $a$ without the unsatisfactory use of a connecting rod direct into a rotating cycle. In this way, approximately four times the power is to be expected according to the efficiency diagrams, and the use of petrol or other fuel is quite small in proportion. The remaining parts of the engine are of known construction.

Obviously this new arrangement can also be employed for compressors and for other single-stroke engines as hitherto with great advantage for piston movements required to be reciprocatory only.

Having now described my invention what I claim and desire to secure by Letters Patent is—

1. A double-acting internal combustion engine comprising a casing, a chamber therein, a continuous undulating track within the wall of the casing, an internal revoluble shaft, a double-acting revoluble and reciprocative main piston within the chamber and dividing same into opposite combustion spaces a transverse carrier bolt located within a slotted portion of the shaft, the opposite ends of said carrier bolt engaging the track, a secondary piston revoluble and reciprocative with and within the main piston, slots within the wall of the secondary piston for the reception of the carrier bolt, opposite charging chambers between the main and secondary pistons, means for feeding explosive gases into the charging chamber, means for the transference of the gases to the combustion chambers, spring-operated valves co-operating with the secondary piston, means for firing the explosive gas whereby the pistons are reciprocated a number of times per shaft revolution, and means for automatically effecting the discharge of the products of combustion.

2. An internal combustion engine in accordance with claim 1 having displaceable and rotating piston seatings.

3. An internal combustion engine in accordance with claim 1 having for the pistons and seatings carrier means and coacting curved slots, whereby the working periods and chambers are formed through the reciprocatory and rotating movement of the carrier means.

4. An internal combustion engine in accordance with claim 1 having coacting curved slots and carriers having such construction as to permit them simultaneously to function in opposite directions.

5. An internal combustion engine in accordance with claim 1 having means to cause several explosions and power transmission to the shaft in one rotation thereof.

6. An internal combustion engine in accordance with claim 1 having means to rotate the pistons comprising curved slots with several axial tracks, a groove in the cylinder and a bolt member which passes through the pistons.

7. An internal combustion engine in accordance with claim 1 having gas channels, means for closing the channels, and top covers for the explosion chamber having gas outlet means, and having an outlet slot.

8. An internal combustion engine having a cylinder, a piston reciprocative in the cylinder, means for rotating the piston comprising a groove in the cylinder periphery, a supplemental piston therein, means to rotate the supplemental piston, and valve means arranged and operating to supply fresh gas and to secure pre-compression thereof and compression immediately following the power stroke of the piston.

9. An internal combustion engine having pistons, a carrier having a roller form and has internal spindles that can play in an axial direction to function as force compensators.

In testimony whereof I affix my signature.

Professor NICOLAI von GRIBOJEDOFF.